No. 622,956. Patented Apr. 11, 1899.
A. VON KNORRING.
MEANS FOR AUTOMATICALLY CLOSING BULKHEAD DOORS.
(Application filed Nov. 7, 1898.)
(No Model.) 6 Sheets—Sheet 1.

No. 622,956. Patented Apr. 11, 1899.
A. VON KNORRING.
MEANS FOR AUTOMATICALLY CLOSING BULKHEAD DOORS.
(Application filed Nov. 7, 1898.)
(No Model.) 6 Sheets—Sheet 2.
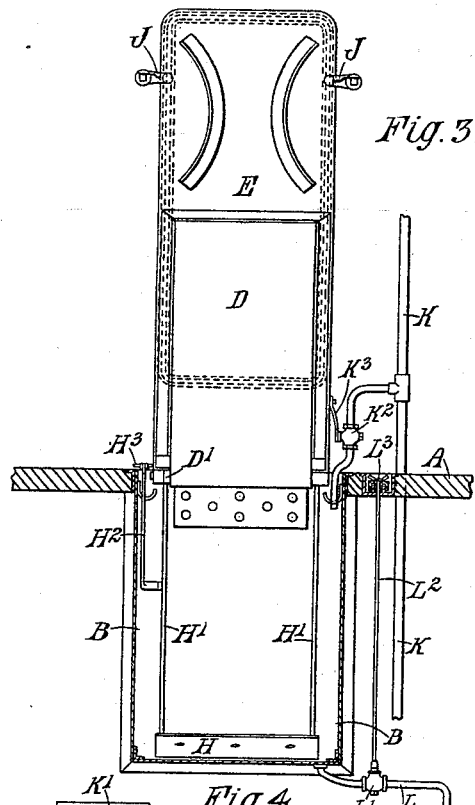
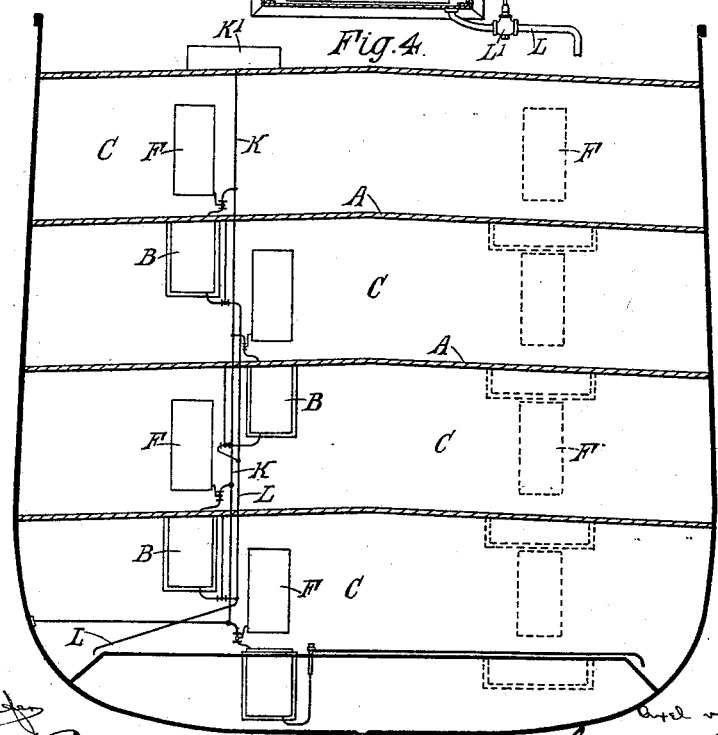

No. 622,956. Patented Apr. 11, 1899.
A. VON KNORRING.
MEANS FOR AUTOMATICALLY CLOSING BULKHEAD DOORS.
(Application filed Nov. 7, 1898.)
(No Model.) 6 Sheets—Sheet 3.
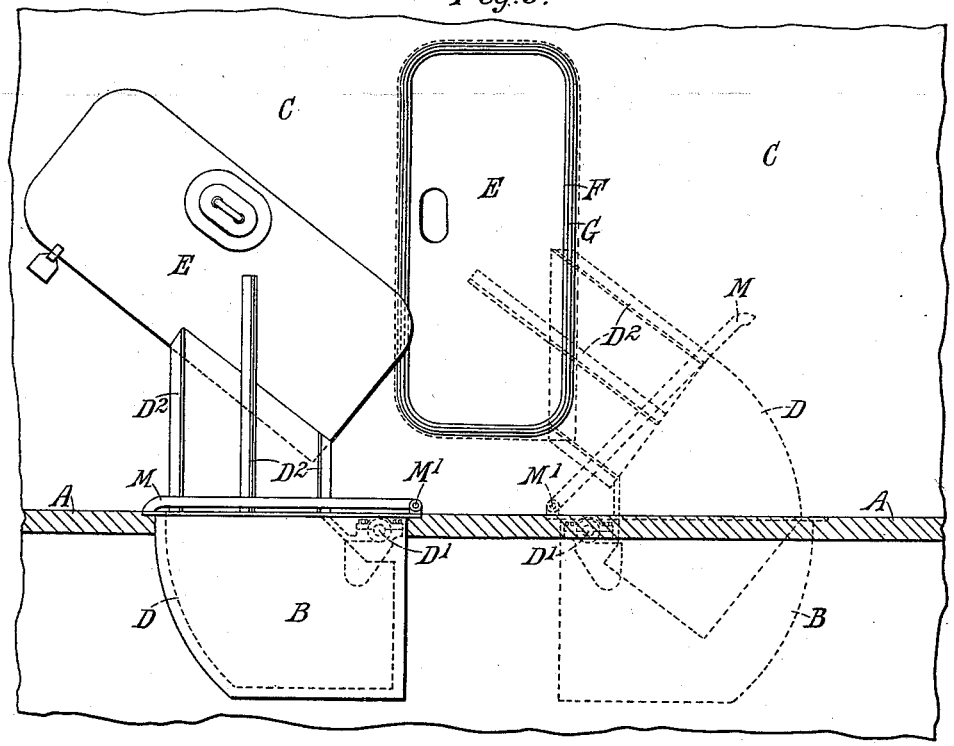
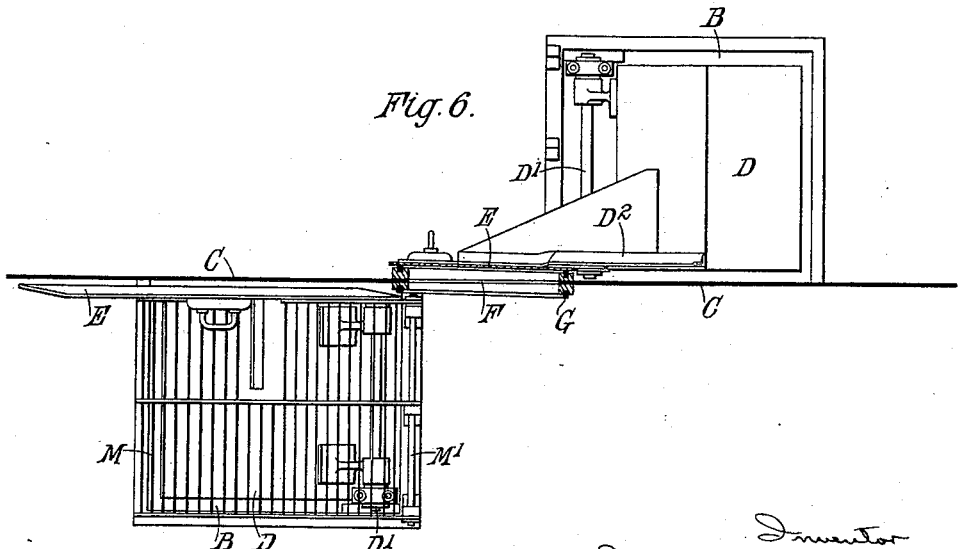

No. 622,956. Patented Apr. 11, 1899.
A. VON KNORRING.
MEANS FOR AUTOMATICALLY CLOSING BULKHEAD DOORS.
(Application filed Nov. 7, 1898.)
(No Model.) 6 Sheets—Sheet 4.
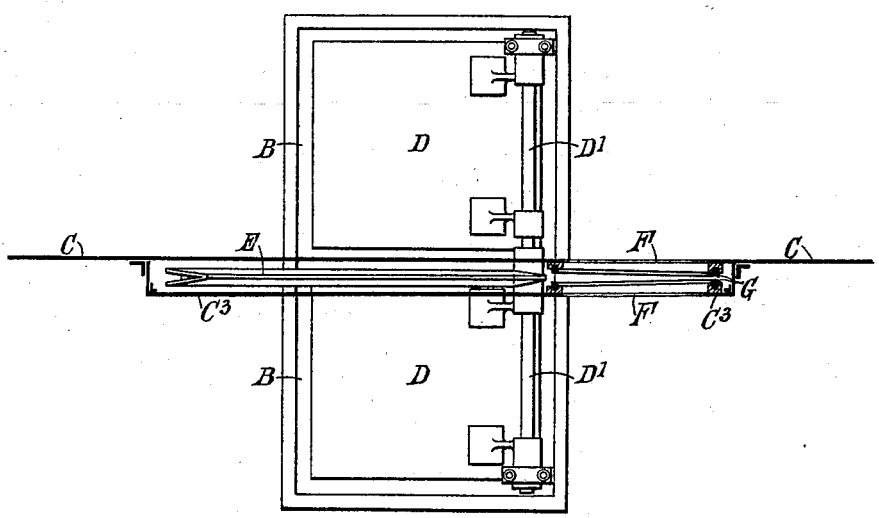
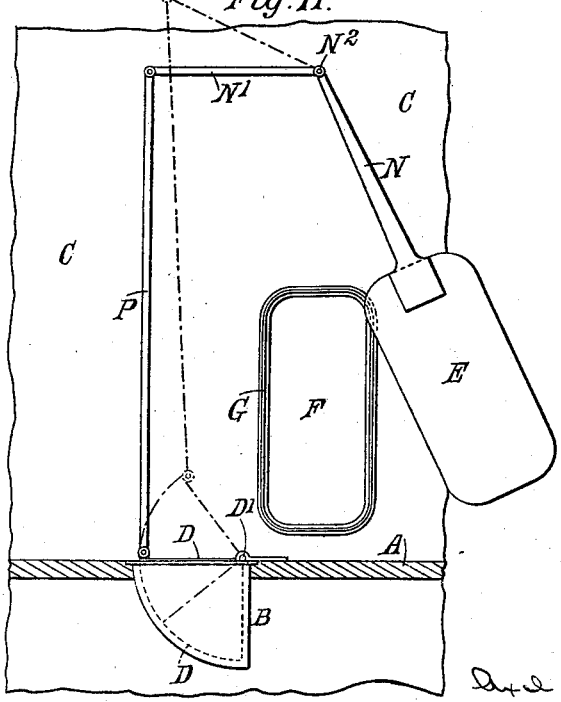

No. 622,956. Patented Apr. 11, 1899.
A. VON KNORRING.
MEANS FOR AUTOMATICALLY CLOSING BULKHEAD DOORS.
(Application filed Nov. 7, 1898.)
(No Model.) 6 Sheets—Sheet 5.
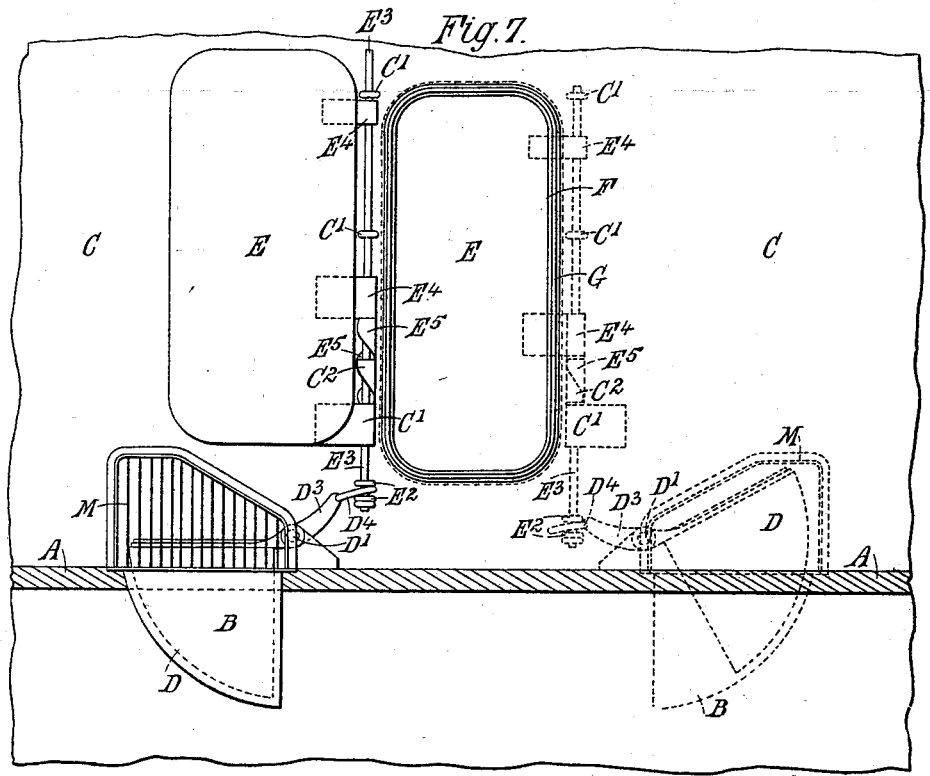
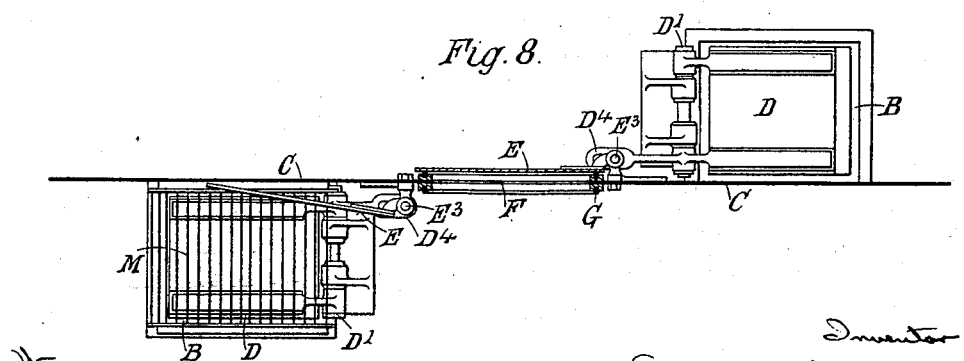

No. 622,956. Patented Apr. 11, 1899.
A. VON KNORRING.
MEANS FOR AUTOMATICALLY CLOSING BULKHEAD DOORS.
(Application filed Nov. 7, 1898.)
(No Model.) 6 Sheets—Sheet 6.

UNITED STATES PATENT OFFICE.

AXEL VON KNORRING, OF HELSINGFORS, FINLAND.

MEANS FOR AUTOMATICALLY CLOSING BULKHEAD-DOORS.

SPECIFICATION forming part of Letters Patent No. 622,956, dated April 11, 1899.

Application filed November 7, 1898. Serial No. 695,734. (No model.)

*To all whom it may concern:*

Be it known that I, AXEL VON KNORRING, engineer, a subject of the Emperor of Russia, residing at 3 Andregatan, Helsingfors, Finland, have invented certain new and useful Improved Means for Automatically Closing Bulkhead and other Water-Tight Doors, of which the following is a specification, reference being had to the accompanying drawings, in which—

Figure 2:
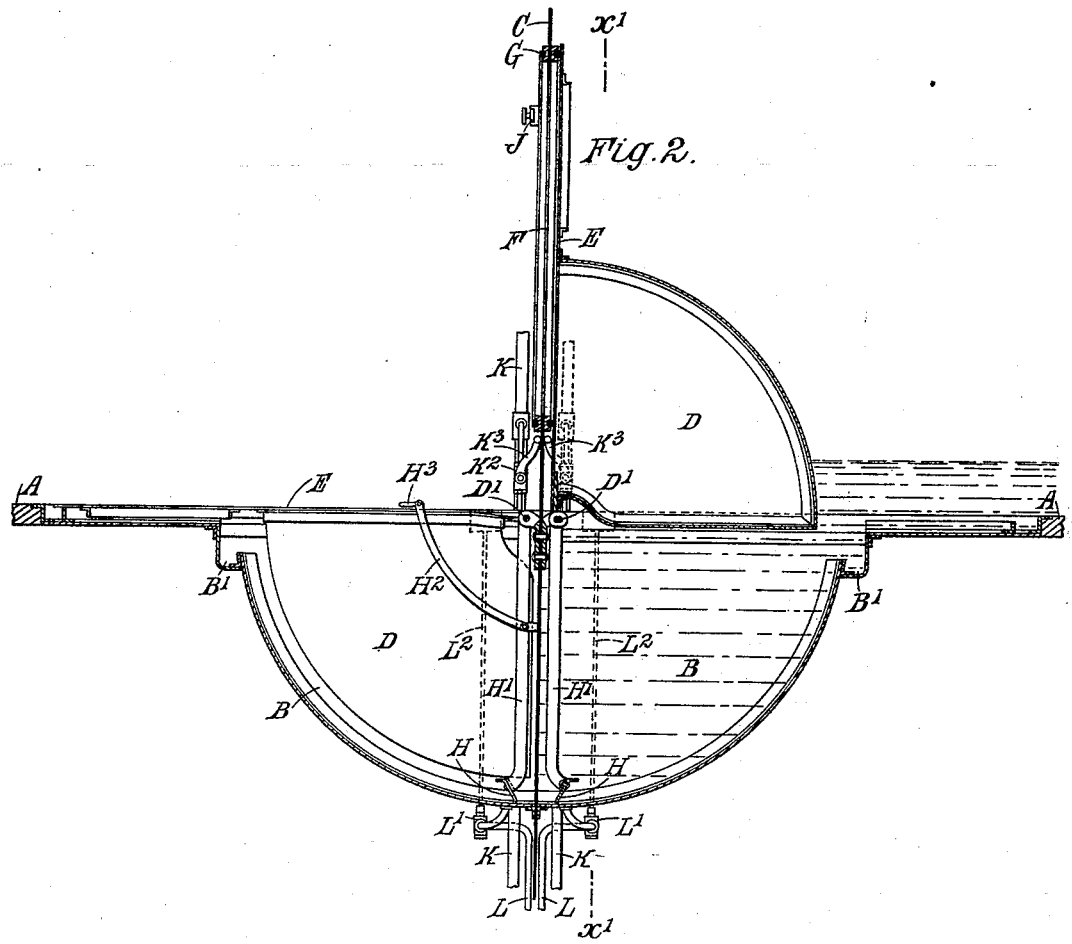
Figure 1:
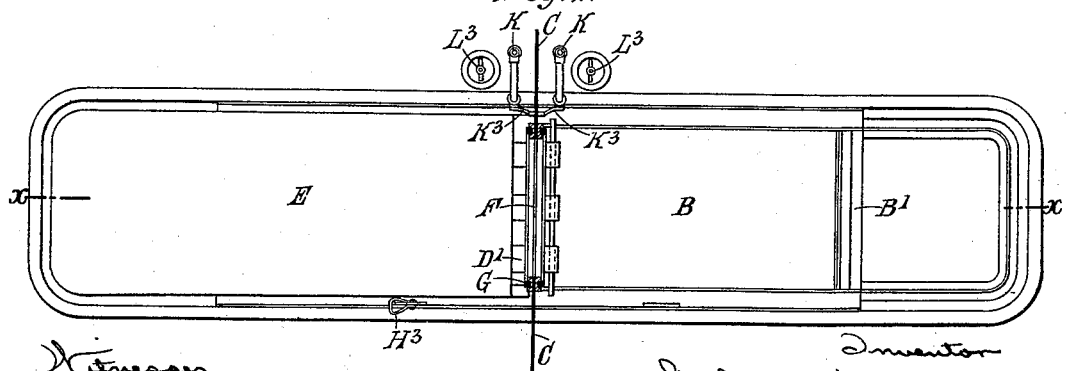

Figure 1 is a plan, partly in horizontal section, and Fig. 2 a section on the line $x\,x$, Fig. 1, showing one form of my improved apparatus. Fig. 3 is a section on the line $x'\,x'$, Fig. 2. Fig. 4 is a midship section of a vessel, illustrating diagrammatically the method of installing several sets of my improved apparatus therein. Fig. 5 is a front elevation, and Fig. 6 a plan, showing another form or modification of my said invention. Fig. $6^a$ is a plan showing another form or modification of my said invention. Figs. 7 and 8 and Figs. 9 and 10 are similar views to Figs. 5 and 6, respectively, showing further modifications of my improved apparatus; and Fig. 11 is a front elevation showing a still further modification of my said invention.

Like letters indicate corresponding parts throughout the drawings.

My invention relates to automatic apparatus for closing bulkhead and other water-tight doors in ships when the water rises beyond a predetermined level in one or other of the adjacent compartments of the ship; and my said invention is chiefly designed to simplify and improve the construction and increase the efficiency of such apparatus.

One feature of my said invention is the employment of a hinged or pivoted bulkhead-door connected with a closed pivoted tank or float which works in a suitable open tank let into one or other of the decks of the ship for the purpose of closing the said door when water enters the corresponding compartment of the ship and fills the said tank, the whole being so arranged that when the door is completely closed the lower part of the said closed tank or float will be below the lower edge of the opening in the bulkhead, which is situated a considerable distance above the level of the deck. These floats are connected, either directly or through the medium of levers, linkwork, or other suitable gearing, with the water-tight doors to be closed in such a manner that when the said floats are raised by the water they will close the said doors. Therefore the inrush of water to either compartment of a ship will close all the doors leading from the said compartment.

My said invention, moreover, comprises other improvements, hereinafter described.

In each deck A of the vessel are arranged open tanks B, of quadrantal shape, one on each side of the bulkhead C. In each of these tanks is arranged a correspondingly-shaped closed tank or float D, which is adapted to turn about a hinge joint or pivot D' at one of the upper edges thereof and is so connected with the door E that when water enters and fills the tank B the float D will be raised and the doorway or opening F in the bulkhead closed, as hereinafter described.

In the arrangement shown in Figs. 1 to 3 the door E is attached to the outer or upper radial surface of the float D, so that when the door is open it will be flush with the deck, as shown on the left in Fig. 2, and as the said float rises in the tank B the door E will be raised thereby and ultimately pressed against the bulkhead C, so as to close the doorway F, a strip G, of india-rubber or other suitable packing, being provided around the said doorway to make a water-tight joint.

The tank B is made of ample size to receive the float D, so that any dust or rubbish which may enter the space between the float and the sides of the tank may fall to the bottom thereof, whence it should be regularly cleared away. For this purpose I provide a scraper H, which is mounted on arms H', turning about the pivot-pin D', and approximately fits the annular space between the bottom of the tank B and the curved surface of the float. To one of the arms H' is pivoted a curved rod $H^2$, extending up to the level of the deck, where it is provided with a handle $H^3$. By pulling the handle $H^3$ upward the scraper H can be moved along the annular space beneath the float D, and the accumulated dust or rubbish thus raised to the top of the tank, where it will fall into a channel or recess B' provided for its reception and from which it can be readily removed.

I sometimes provide a catch or button J on the bulkhead C in such a position that it can be swung or turned, so as to lock the door E in its closed position when desired.

It will be seen on referring to the drawings that the lower edge of the opening F in the bulkhead is a considerable distance above the level of the deck and that when the door is closed the lower part of the float D is below the lower edge of the said opening. This arrangement insures the closing of the door before the water in the compartment rises to the level of the lower edge of the said opening.

To insure the efficient protection of each doorway F, two doors E, tanks B, and floats D are arranged in combination therewith, one on each side of the bulkhead, as shown, so that the doorway will be closed whether the water enters the compartment on one side or on the other side of the bulkhead.

To permit of the apparatus being tested from time to time to ascertain whether it is in working order and at the same time to enable the doors E to be closed at any time at will, I provide a system of pipes K, in connection with a tank K' on the upper deck, or, if desired, with the sea, which pipes are arranged in such a manner that any of the tanks B, containing the floats D, may be filled with water through branch pipes controlled by valves or cocks $K^2$. The levers $K^3$ for opening and closing these cocks are so arranged that the doors E as they reach their closed position will engage therewith, and thus close the said cocks when the tanks B are full. The doors having thus been closed can be opened again by draining away the water from the tanks B into the bilges through pipes L, controlled by valves or cocks L', which are adapted to be actuated from the level of the deck by means of rods $L^2$, provided with handles $L^3$.

The valves or cocks for filling and emptying the tanks B may be placed close to each tank, as shown, or the said valves or cocks may be arranged to be worked from the main deck or any other part of the ship, so as to enable each tank to be filled separately or all to be filled simultaneously.

In the arrangement shown in Figs. 5 and 6 the doors E are arranged so as to move parallel with the bulkhead C and are rigidly connected to the floats D by means of bars or angle-irons $D^2$, the packing G being arranged at a slight angle to the bulkhead, so that the door can be brought tightly up against the same, and thus form a water-tight joint. When the doorways F are open, the upper surfaces of the floats D are protected by means of gratings M, which are pivoted at M' along one edge to the deck A, so that they will be lifted by the said floats when the latter rise. A grating of this kind is shown in its lowermost position on the left-hand side of Figs. 5 and 6 and in its raised position in dotted lines on the right-hand side of Fig. 5.

In Fig. $6^a$ I have shown a modification of the arrangement shown in Figs. 5 and 6, in which a single door is employed, adapted to be operated from either side of the bulkhead. For this purpose the bulkhead C is provided with an outer wall or casing $C^3$, arranged so as to form a chamber which is closed on all sides except at the doorways F. In order to make a water-tight joint between the said bulkhead and the door, I provide, for example, the inner sides of the walls C $C^3$ of the said chamber with inclined joint-pieces G to engage with the similarly-inclined surfaces of the door E, as shown, so as to form a water-tight joint on both sides, or, if desired, the joint can be made by making the door slightly flexible and arranging it so as to press against india-rubber packing, or other suitable means may be employed for this purpose. The said door E is mounted on a shaft D', which passes through the bulkhead-walls C $C^3$ and has the floats D D keyed or otherwise suitably secured thereto at its ends. By these means the door E will be closed by one or other of the floats D at whichever side of the bulkhead the water may enter. If desired, the floats D can be arranged so as to turn freely on the shaft D' and be connected thereto by pawls engaging with ratchet-wheels on the said shaft, so as to allow the inoperative float to remain at rest in its tank B when the door is closed by the float on the other side of the bulkhead.

In the arrangement shown in Figs. 7 and 8 the doors E turn about vertical hinge-joints and the floats D are provided with arms $D^3$, which extend from the opposite side of their hinge-pins D'. These arms are each provided with a forked or slotted end $D^4$, adapted to engage with collars $E^2$ on the rod or hinge-pin $E^3$ of the door, which is capable of turning and of sliding longitudinally in bearings C' on the bulkhead C. To this hinge-pin $E^3$ the door E is rigidly secured by means of brackets $E^4$, and to one of the said brackets is secured a partial screw-thread or inclined piece $E^5$, adapted to engage with a similar inclined piece $C^2$, secured to one of the bearings C' in such a manner that the door E will be turned about its axis to open and close the doorway E as its hinge-pin $E^3$ rises and falls in the bearings C'. The weight and buoyancy of the float D are so adjusted that the door E will be overbalanced and raised to its uppermost position, as shown on the left-hand side of Fig. 7, and thus opened, when there is no water in the tank B; but when the said tank is full of water the arm $D^3$ will be depressed and the door E allowed to descend and close the opening F, as shown in dotted lines on the right-hand side of Fig. 7. The floats D are in this case protected by fixed gratings M.

Figure 9:
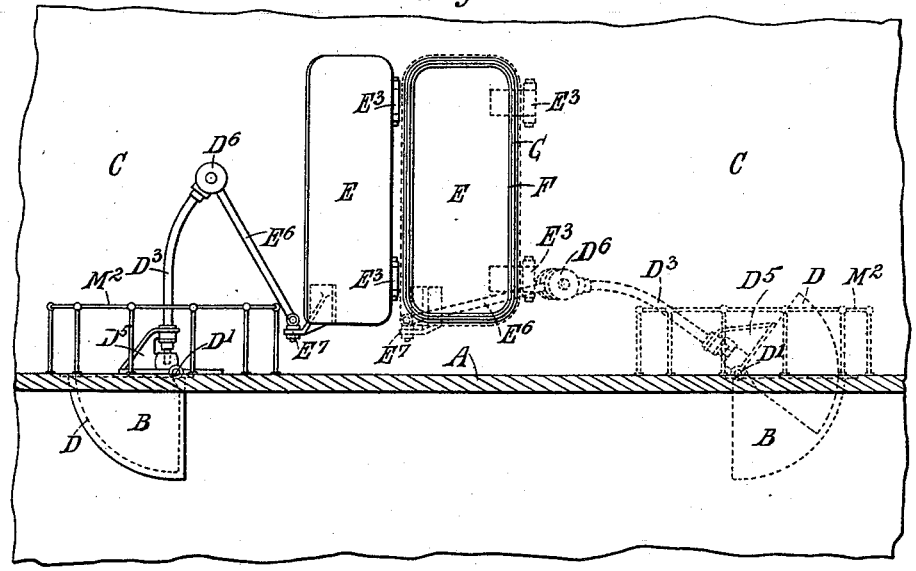
Figure 10:
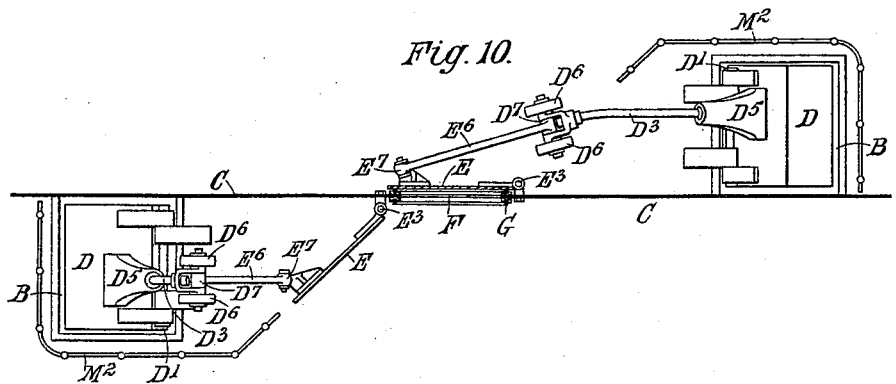

In Figs. 9 and 10 I have shown a further modification of my improved apparatus, in which the floats D are provided with arms $D^3$, which are secured in brackets $D^5$ on the said floats in such a manner as to be capable of turning freely therein and are provided with counterbalance-weights $D^6$. The doors E are hinged at $E^3$ to the bulkhead C and are connected to the floats D by links $E^6$, which are connected to the arms $D^3$ and to the doors E, respectively, by means of universal joints at $D^7$ and $E^7$. A guard-rail $M^2$ is in this case fixed on the deck to protect each float D.

My said invention can also be applied to doors sliding either horizontally or vertically by the use of suitable levers to work the door from the hinged float.

My said invention may also be applied in other ways—for example, as shown in Fig. 11. In this arrangement the door E is supported on one arm N of a bell-crank lever N N', pivoted at $N^2$ to the bulkhead C and having its other arm N' connected to the float D by means of a link or connecting-rod P, so that when the tank B is empty the parts will be in the position shown in full lines in this figure, and when the tank is filled with water the parts will be in the position shown in dotted lines, with the door closed.

A similar system of floats to either of those above described may also be applied for closing any or all of the hatch or companion ways in a ship, thus preventing the water from penetrating from an upper deck down below or from a lower deck up to the next.

The openings or doorways in the bulkheads are arranged so as not to commence at the deck-level, but to commence about one foot above the deck-level, as shown, so that before any compartment has been filled to such a height that the water could pass through the doorways into other compartments the doors will be closed. It is most convenient to have two doors to each opening, as shown, one door coming into operation when the water enters on one side of the bulkhead and the other door serving the same purpose when water enters on the other side of the bulkhead.

If desired, one float may be arranged so as to close two or more doors on the same or different decks.

The doors may be made water-tight in various ways. In some instances it may be most suitable to have the doors and their seats carefully machined; but in most cases it is better to use india-rubber or other suitable packing, as shown. As a rule, the pressure of the water on the door when closed will assist in making a water-tight joint.

What I claim is—

1. The combination, with the deck of a ship and a bulkhead having an opening therein, of a bulkhead-door for closing said opening, an open tank sunk beneath the deck, a pivoted float in said tank, and connecting means between said bulkhead-door and said float, the whole so arranged that, when the door is completely closed, the lower part of said float is below the lower edge of said opening in the bulkhead, substantially as, and for the purposes, hereinbefore described.

2. A bulkhead-door attached to the upper side of a sector-shaped float which is pivoted at or near the axis of the sector below the lower edge of the opening in the said bulkhead, and which works in an open tank sunk beneath the deck, substantially as hereinbefore described.

3. The combination, with the open tank and the float working therein, of a scraper movable about an axis coincident with that of the float, in the space between the said float and the bottom of the tank, substantially as, and for the purposes, hereinbefore described.

4. The combination, with several sets of my improved apparatus, of a water-tank in the upper part of the vessel, a system of pipes for conducting water therefrom into the tanks in which the movable floats are situated, and valves or cocks in the said pipe adapted to be closed by means of the said floats when the latter rise to or nearly to their uppermost position, substantially as described.

5. The combination, with a bulkhead having an opening therein, and a bulkhead-door pivotally mounted near said opening, of a sector-shaped float which is pivotally supported at or near the axis of the sector, a tank receiving said float and having its upper edge below the lower edge of the opening in the said bulkhead, and connecting means between said float and said bulkhead-door, substantially as, and for the purposes, hereinbefore described.

In testimony whereof I have hereunto set my hand in presence of two subscribing witnesses.

AXEL VON KNORRING.

Witnesses:
 E. ALOPANS,
 ANDERS KRAMER.